Oct. 16, 1951     C. F. CHRISTIE     2,571,539

AIR CONTROL VALVE FOR CARBURETOR GASKETS

Filed Jan. 3, 1949

Inventor

Cleve F. Christie

By *Clarence A. O'Brien and Harvey B. Jacobson*
                      Attorneys

Patented Oct. 16, 1951

2,571,539

UNITED STATES PATENT OFFICE 2,571,539

AIR CONTROL VALVE FOR CARBURETOR GASKETS

Cleve F. Christie, Knoxville, Tenn.

Application January 3, 1949, Serial No. 68,875

1 Claim. (Cl. 137—69)

The present invention relates to new and useful improvements in gaskets, and more particularly to a gasket for use between a carburetor and the intake manifold of an engine and embodying the provision of an air control valve to admit air directly into the intake manifold, when desired.

An important object of the invention is to provide means for overcoming the feeding of an overload mixture from the carburetor to an engine and to adjust the ratio of fuel and air mixture at a point between the carburetor and the intake manifold to save fuel and to improve the operating efficiency of the engine.

A further object of the invention is to provide an air control valve connected directly in the gasket between the carburetor and the intake manifold whereby air may be easily and quickly supplied to the intake manifold of the engine.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
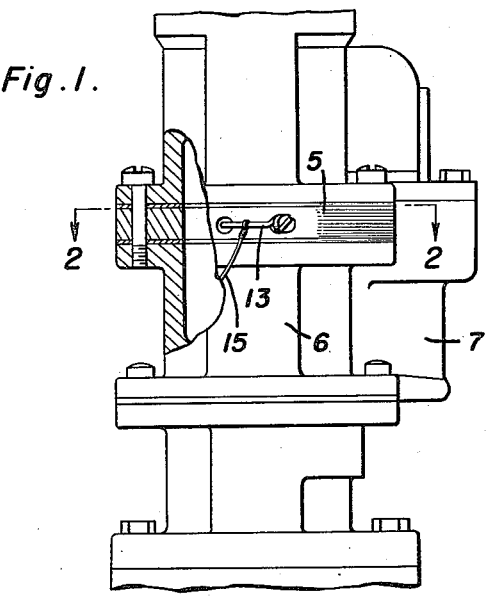
Figure 1 is a fragmentary side elevational view of the intake pipe of an engine showing the gasket mounted in position with respect thereto.

Referring now to the drawing in detail wherein, for the purpose of illustration, I have disclosed a preferred embodiment of the invention, the numeral 5 designates the gasket generally and which is of a type suitable for mounting in an inlet pipe 6 leading from a carburetor 7 to the inlet manifold (not shown) of an internal combustion engine.

The gasket is formed with an opening 8 in one side thereof to provide an air passage and whereby air may be supplied directly to the inlet pipe 6 between the carburetor 7 and the intake manifold of the engine. The air passage 8 is formed with a valve seat 9 for the tapered inner end 10 of a needle type valve 11.

The valve 11 is formed as a straight free end of a resilient wire rod 13 which is bent substantially angularly at the outer edge of the gasket and secured at its other end to the gasket by a screw 14. A wire or pull rod 15 is attached to the rod 13 at a point adjacent the valve 11 and extends to a position within reach of the operator of the engine.

Figure 2:
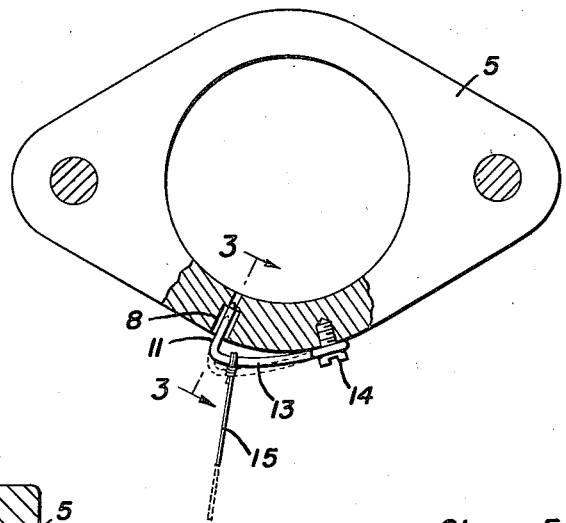
Figure 2 is a plan view of the gasket with parts shown in section and showing the valve in open position.
Figure 3:
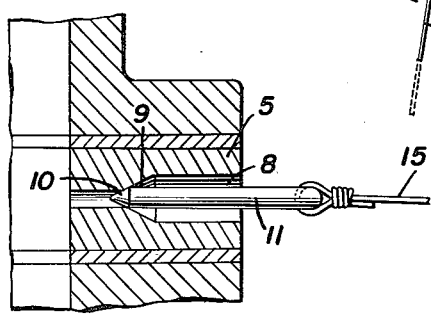
Figure 3 is an enlarged sectional view taken on a line 3—3 of Figure 1.

In the operation of the device, the rod 13 is shaped to normally hold valve 11 in a closed position, aided by suction of the engine and a pulling force exerted on pull wire 15 will flex rod 13 to open valve 11 into a position shown by dotted lines in Figure 2 and air is admitted directly to the inlet pipe 6 through passage 8.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A gasket comprising a flat ring-like body having a radial air inlet passage, a valve seat in the passage, a resilient wire valve having a tapered inner end engaging the valve seat and an angular outer end anchored to the gasket, and manipulating means attached to the valve intermediate said ends to open the valve by a flexing of the outer end thereof.

CLEVE F. CHRISTIE.

REFERENCES CITED

The following references are of record in the file of this patent:

UNITED STATES PATENTS

| Number | Name | Date |
|---|---|---|
| 402,373 | Whitehill | Apr. 30, 1889 |
| 1,200,844 | Johnson | Oct. 10, 1916 |
| 1,235,800 | Heller | Aug. 7, 1917 |
| 1,457,403 | Snagg | June 5, 1923 |
| 1,572,558 | Preisser | Feb. 9, 1926 |
| 1,721,633 | Matteson | July 23, 1929 |